(12) United States Patent
Esenwein et al.

(10) Patent No.: US 11,485,006 B2
(45) Date of Patent: Nov. 1, 2022

(54) HAND-HELD POWER TOOL COMPRISING A FILTER SUPPORT

(71) Applicant: Robert Bosch GmbH, Stuttgart (DE)

(72) Inventors: Florian Esenwein, Leinfelden-Echterdingen (DE); Peter Stierle, Pliezhausen (DE); Manfred Lutz, Filderstadt (DE); Thomas Schomisch, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 687 days.

(21) Appl. No.: 16/063,099

(22) PCT Filed: Oct. 4, 2016

(86) PCT No.: PCT/EP2016/073598
§ 371 (c)(1),
(2) Date: Jun. 15, 2018

(87) PCT Pub. No.: WO2017/102126
PCT Pub. Date: Jun. 22, 2017

(65) Prior Publication Data
US 2020/0276694 A1  Sep. 3, 2020

(30) Foreign Application Priority Data

Dec. 17, 2015 (DE) .................. 10 2015 225 748.7
Jul. 25, 2016 (DE) .................. 10 2016 213 618.6

(51) Int. Cl.
*B25F 5/02* (2006.01)
*B01D 46/00* (2022.01)
*B24B 23/00* (2006.01)

(52) U.S. Cl.
CPC ............ *B25F 5/02* (2013.01); *B01D 46/0005* (2013.01); *B24B 23/005* (2013.01)

(58) Field of Classification Search
None
See application file for complete search history.

(56) References Cited

U.S. PATENT DOCUMENTS 2,550,319 A * 4/1951 Wright .................. B24B 23/00
                                                                55/509
8,398,465 B2 * 3/2013 Hoeschele ............ B24B 23/028
                                                                451/359

(Continued)

FOREIGN PATENT DOCUMENTS

CH           336121       2/1959
CN        101657295 A    2/2010

(Continued)

OTHER PUBLICATIONS

English Translation of EP 3109006, Espacenet, all pages https://worldwide.espacenet.com/patent/search/family/056119355/publication/EP3109006B1?q=ep%203109006 (Year: 2016).*

(Continued)

*Primary Examiner* — Christopher P Jones
*Assistant Examiner* — Brit E. Anbacht
(74) *Attorney, Agent, or Firm* — Maginot, Moore & Beck LLP

(57) ABSTRACT

A hand-held power tool includes a housing, a filter support, a plurality of securing element, and an actuating unit. The filter support has receiving openings, at least one first fixing element, and at least one second fixing element. The receiving openings are configured to receive filter elements configured to seal the hand-held power tool against a penetration of dust into the housing of the hand-held power tool. First and second fixing elements are fixable to corresponding securing elements arranged on the hand-held power tool, and are configured to releasably fix the filter support to the (Continued)

housing. The actuation unit is actuatable to release the filter support from the hand-held power tool.

11 Claims, 15 Drawing Sheets

(56) References Cited

U.S. PATENT DOCUMENTS

| | | | | |
|---|---|---|---|---|
| 9,597,624 | B2* | 3/2017 | Hiller | B24B 55/102 |
| 2005/0281627 | A1* | 12/2005 | Britz | B23Q 11/127 |
| | | | | 408/67 |
| 2008/0104936 | A1* | 5/2008 | Kellermann | B24B 27/08 |
| | | | | 55/357 |
| 2009/0095249 | A1* | 4/2009 | Panasik | B01D 46/0035 |
| | | | | 123/198 E |
| 2010/0323593 | A1* | 12/2010 | Hoeschele | B24B 23/028 |
| | | | | 451/359 |
| 2015/0328573 | A1* | 11/2015 | Hiller | B25F 5/008 |
| | | | | 451/359 |
| 2017/0028544 | A1* | 2/2017 | Sterling | B25D 17/12 |
| 2018/0319002 | A1* | 11/2018 | Esenwein | H02K 5/20 |
| 2018/0326337 | A1* | 11/2018 | Esenwein | B25F 5/02 |

FOREIGN PATENT DOCUMENTS

| | | | | |
|---|---|---|---|---|
| CN | 104440804 A | | 3/2015 | |
| CN | 204248666 U | | 4/2015 | |
| DE | 20 2005 007 594 U1 | | 10/2006 | |
| DE | 10 2007 017 550 A1 | | 10/2008 | |
| DE | 10 2008 009 277 A1 | | 8/2009 | |
| DE | 10 2009 026 519 A1 | | 12/2010 | |
| DE | 102015225748 A1 | * | 6/2017 | B25F 5/008 |
| DE | 102016213617 A1 | * | 6/2017 | B25F 5/02 |
| EP | 2 944 423 A1 | | 11/2015 | |
| EP | 3109006 | * | 12/2016 | B01D 46/0002 |
| JP | 58-49066 A | | 3/1983 | |
| JP | 2002-283255 A | | 10/2002 | |
| JP | 2010-36260 A | | 2/2010 | |
| WO | 2015-066759 A1 | | 5/2015 | |
| WO | WO-2017102126 A1 | * | 6/2017 | B25F 5/008 |

OTHER PUBLICATIONS

International Search Report corresponding to PCT Application No. PCT/EP2016/073598, dated Jan. 20, 2017 (German and English language document) (7 pages).
"The Use and Maintenance of Agricultural Rubber Products", Guangdong Institute of Chemical Technology, May 1979, pp. 141-142, Chemical Industry Press.

* cited by examiner

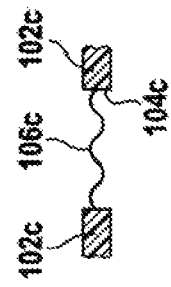
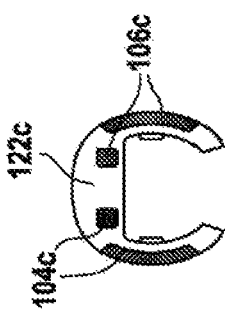
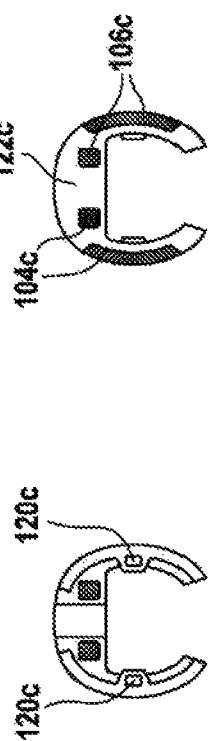
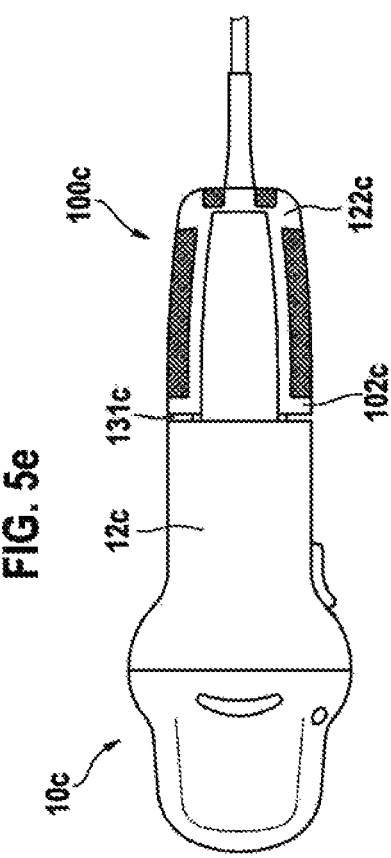

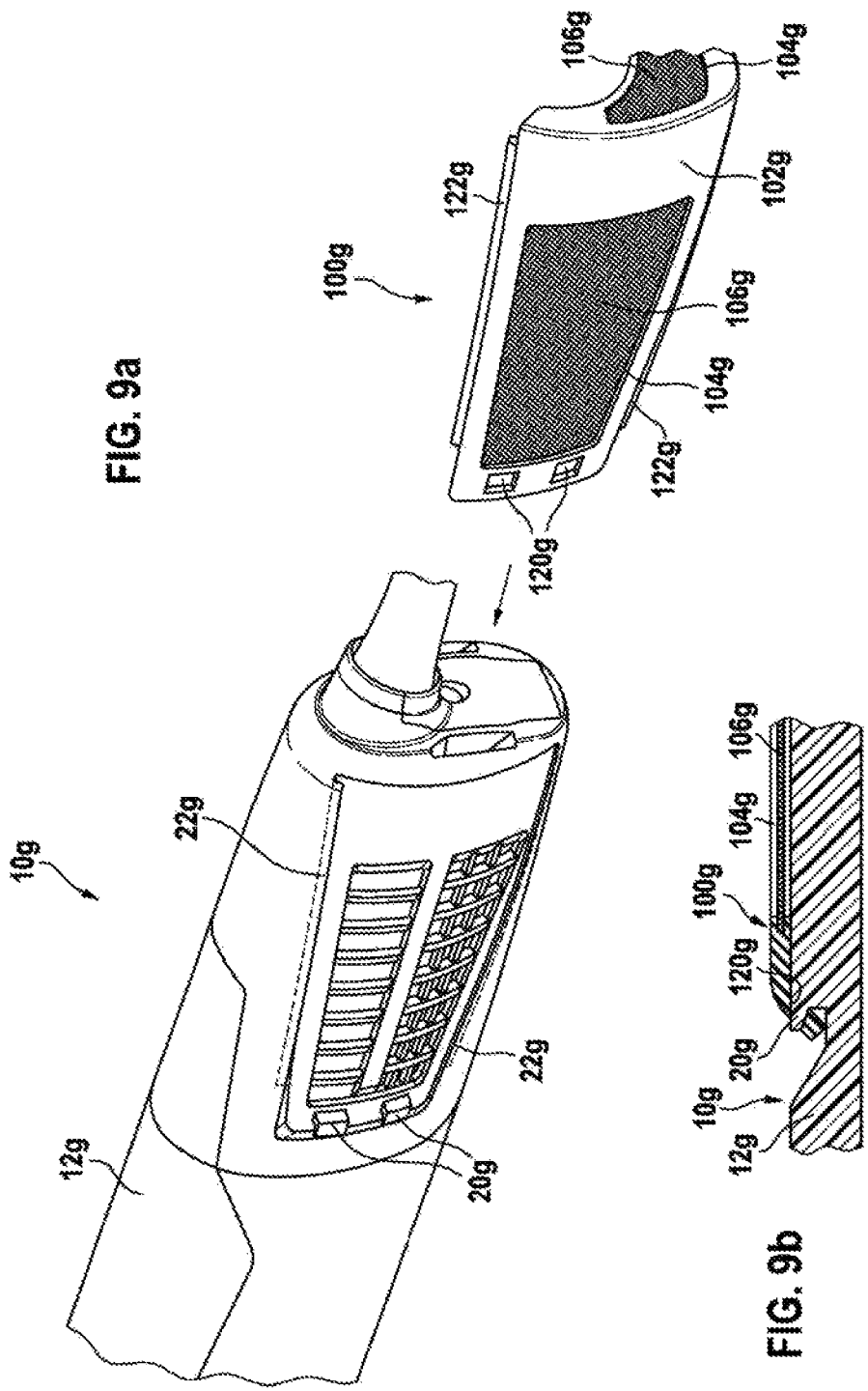

HAND-HELD POWER TOOL COMPRISING A FILTER SUPPORT

This application is a 35 U.S.C. § 371 National Stage Application of PCT/EP2016/073598, filed on Oct. 4, 2016, which claims the benefit of priority to Ser. No. DE 10 2015 225 748.7, filed on Dec. 17, 2015 in Germany and which claims the benefit of priority to Ser. No. DE 10 2016 213 618.6, filed on Jul. 25, 2016 in Germany, the disclosures of which are incorporated herein by reference in their entirety.

BACKGROUND

The disclosure relates to a hand-held power tool.

In DE 2008 009 277 A1 is ah electric hand-held power appliance, having a housing body that accommodates the electric-motor drive components and in which air inlet openings are also provided for a cooling air flow applied to the electric-motor drive components. Furthermore, the appliance is realized such that a filter means is provided, in the region of the air inlet openings, by means of which, in particular, magnetization dust can be kept away from the electric-motor drive components.

SUMMARY

There ensues from the prior art the object of providing a hand-held power tool having a filter carrier, the filter carrier being easily separable from the hand-held power tool.

The disclosure relates to a hand-held power tool having a housing and having a filter carrier. The filter carrier is realized such that it can be separably fastened to the hand-held power tool. The hand-held power tool may be realized, exemplarily, as an angle grinder, a power drill, a hammer drill, an orbital sander, a router, a power sander, etc. The hand-held power tool my furthermore be realized as mains-operated hand-held power tool or as a battery-operated hand-held power tool. A motor, in particular an electric motor, may be accommodated in the housing of the hand-held power tool. The motor is designed to drive a drive shaft. Furthermore, the hand-held power tool has a tool that can be connected to the drive shaft of the elect is motor, for example via a transmission. The hand-held power tool has a housing axis, which may represent the tool axis or the drive axis of the hand-held power tool. The drive axis of the hand-held power tool is defined, in particular, by the drive shaft of the motor of the hand-held power tool. The tool axis of the hand-held rower tool is defined, in particular, by an output shaft of the hand-held power tool that is designed to transmit torque to a tool of the hand-held power tool. The filter carrier comprises a filter carrier element that has at least one receiving opening, which is designed to receive a filter element. The receiving opening of the filter carrier may advantageously be arranged in the region of an air inlet opening of the hand-held power tool, in such a manner that an air flow, in particular a cooling air flow, can enter the hand-held power tool solely through the receiving opening. The filter carrier element of the filter carrier may made, advantageously, of dimensionally stable plastic. The filter carrier may be of a single-piece or multi-piece design. The filter element of the filter carrier may advantageously be arranged in such a manner in the receiving opening of the filter carrier that material particles and dust are prevented from entering the housing of the hand-held power tool through the filter element. The filter element of the filter carrier may be made of a dust-tight material. The filter element may be made, in particular, of a woven plastic fabric, woven textile fabric or woven metal fabric, or plastic mesh or metal mesh. In particular, the filter element may be connected to the filter carrier element of the filter carrier by injection molding, adhesive bonding, clipping, insertion, hot-stamping or ultrasonic welding. The filter carrier comprises at least one first fastening element and at least one second fastening element, for separably fastening the filter carrier to respectively corresponding securing elements of the hand-held power tool by positive and/or non-positive engagement. In particular, the first fastening element of the filter element may be realized such that it can be separably connected to the first securing element of the hand-held power tool, and the second fastening element of the filter element may be realized such that it can be separably connected to a second securing element of the hand-held power tool. The filter carrier is realized such that it can be connected, in particular by positive and/or non-positive engagement, to the hand-held power tool.

Furthermore, the filter carrier is realized such that it can be separably fastened to the hand-held power tool by an actuation of an actuating unit. The actuating unit may be assigned to the filter carrier or to the hand-held power tool. The actuating unit is realized, in particular, such that it can be actuated manually or without the use of a tool. Advantageously, the actuating unit is arranged such that it is easily accessible for a user of the hand-held power tool having a filter carrier. In particular, the actuating unit may be arranged on the outer circumferential surface of the filter carrier or of the housing of the hand-held power tool.

The first fastening element of the filter carrier and the second fastening element of the filter carrier may be arranged at opposite end regions of the filter carrier. End regions of the filter carrier are to be understood to mean, in particular, the lateral edges or the filter carrier or the immediate vicinity of the lateral edges of the filter carrier. It is also conceivable for two first or two second fastening elements of the filter carrier to be arranged at opposite end regions. This results in the filter carrier being securely fastened to the hand-held power tool.

Furthermore, the filter carrier may be realized such that it can be applied substantially along a housing axis of the hand-held power tool. In particular, the filter carrier is applied to the hand-held power tool coaxially in relation to the housing axis of the hand-held power tool. Alternatively, the filter carrier may also be realized such that it can be applied substantially transversely in relation to the housing axis of the hand-held power tool.

The first and/or the second fastening element of the filter carrier may be realized as a positive-engagement element. The positive-engagement element may be realized, exemplarily, as a hook-shaped element that is designed to engage in an opening. Alternatively, the positive-engagement element may also be realized as a shackle that is designed to encompass a protuberance. Furthermore, the positive-engagement element may also be realized as an indentation element.

The first and/or the second fastening element of the filter carrier may be realized as a latching element or a latching receiving opening. The latching element may be realized, in particular, as a flexible and/or resilient latching element. The latching element may be realized such that it can be separably connected by positive engagement to a corresponding latching receiving opening. In particular, the latching connection is effected automatically, and thus without an actuation of the actuating unit. The geometry of the latching element, in particular a swan-neck type, torsion or snaphook type geometry, is advantageously realized in such a manner that, owing to the geometry, the latching element is of a resilient design.

The first and/or second fastening element of the filter carrier may be realized so as to be integral with the actuating unit. The actuating unit may advantageously be arranged in the vicinity, in particular the immediate vicinity, of the fastening elements of the filter carrier. In particular, the actuating unit may also be arranged adjacently or directly adjacently to the fastening elements of the filter carrier. Advantageously, the actuating unit may have a structure that is visible to the user, in particular a fluted structure, by which the position at which the actuation is to be effected is indicated to the user.

The actuating unit may be arranged on the filter carrier.

Alternatively, the actuating unit may be arranged on the hand-held power tool.

The first fastening element of the filter carrier may be realized as a latching element, and the second fastening element of the filter carrier may be realized as a posits engagement element, in particular as a guide element that is designed to guide the filter carrier when being applied to the hand-held power tool, and additionally to secure it radially and position it on the hand-held power tool.

The filter carrier may be realized as to be substantially U-shaped. Alternatively, the filter carrier may also be realized in the shape of a shell, in such a manner that it encloses or encompasses the outer circumferential surface of the hand-held power tool, at least partially, in particular in an angular range of less than 270°. In addition, the filter carrier may also be designed to at least partially cover the rear of the hand-held power tool. The filter carrier may be made of a low-flexibility plastic, for example TPE or polyamide, and/or of a dimensionally stable material. In particular, the at least one filter carrier element of the filter carrier may be realized so as to be dimensionally stable, in such a manner that the filter carrier is realized so as to be flexurally stable when being applied to the hand-held power tool. The individual components of the filter carrier, the filter carrier element, the at least one filter element and the first and the second fastening element may be of a single-piece or multi-piece design.

The filter carrier may have an elastic element, wherein the elastic element is designed to secure the filter carrier on the hand-held power tool in at least one direction, by means of biasing. In particular, the filter carrier may be biased contrary to the direction in which the filter carrier is applied to the hand-held power tool. Advantageously, the elastic element is arranged at the rear or on the inner lateral surface of the filter carrier element of the filter carrier. Owing to the biasing effected via the elastic element of the filter carrier element, the filter carrier can be fastened to the hand-held power tool substantially without play. The elastic element of the filter carrier is realized, in particular, so as to be integral with the filter carrier element of the filter carrier. The elastic element of the filter carrier may exemplarily be made of a plastic material that has a significantly greater elasticity that the filter carrier element of the filter carrier. Alternatively, the elastic element may also be realized by the geometry of the filter carrier element of the filter carrier. For example, the filter carrier element of the filter carrier may be realized so as to be at least partially of a swan-necked or corrugated shape in the direction of application. In particular, the second fastening element of the filter carrier may be realized as an elastic element. In this embodiment, the second filter element of the filter carrier and the second securing element of the hand-held power tool may be realized as resilient support elements or spring elements, in particular plastic spring elements. For a detailed disclosure of this fastening type, reference is made to DE 10 2009 026519 A1. In this embodiment, the second fastening element of the filter carrier or the second securing element of the hand-held power tool is realized so as to be elastically deformable transversely in relation to the direction of application. The second fastening element of the filter carrier may advantageously be arranged on the lateral surface of the filter carrier that faces toward hand-held power tool.

Further, the elastic element may be elastically deformable along the direction in which the filter carrier is applied to the hand-held power tool, in such a manner that at least one of the first fastening elements of the filter carrier and one of the first securing elements of the hand-held power tool can be connected only as a result of the deformation of the elastic element, in particular an axial lengthening of the elastic element. In particular, a separable connection of the first fastening element of the filter carrier to the first securing element of the hand-held power tool can be realized as a result of the deformation of the elastic element. In addition, the filter element of the filter carrier may also be realized so as to be elastic.

The securing element of the hand-held power tool corresponding to the first or second fastening element of the filter carrier may be realized as an air inlet opening of the hand-hold power tool. The air inlet opening may be realized, in particular, for radially and/or axially securing the filter carrier to the hand-held power tool. For this purpose, the first or the second fastening element of the filter carrier may be realized, in particular, as a protuberance arranged radially in the direction of the hand-held power tool. In particular, the protuberance of the filter carrier impinges on the lateral wall of an air inlet opening of the hand-held power tool in such a manner that the filter carrier is secured axially and/or radially on the hand-held power tool.

The outer surface of the filter carrier may be realized such that, in the mounted state, it is flush with the outer surface of a housing of the hand-held power tool. In particular, the filter carrier may be realized such that in contour it matches the outer surface of the housing of the hand-held power tool. The outer surface of the filter carrier is to be understood to mean, in particular, the lateral surface of the filter carrier that faces away from the hand-held power tool.

It furthermore proposed that the filter carrier can be attached to the hand-held power tool such that it can be pivoted about a rotary axis, wherein the rotary axis is formed by a securing element in the form of a pivot bearing element of the hand-held power tool. Advantageously, particularly and intuitive application of the filter carrier to the hand-held power tool can thereby be realized.

For the purpose of pivotally applying the filter carrier to the hand-held power tool, at least one first fastening element may be realized as a latching element, and at least one second fastening element may be realized as a hook-shaped pivot bearing, wherein the filter carrier element can be mounted on the corresponding securing element the hand-held power tool, in particular a formed-on stud, by means of the second fastening element. Alternatively, it is likewise conceivable for the second fastening element to be realized as a stud, and for the securing element to be realized as a pivot bearing.

In particular, the filter carrier may have a stop element, which is designed to limit the pivot movement. As a result, advantageously, the filter carrier element, when in the fastened state, cannot deviate upward past the fastening position. Particularly advantageously, the filter carrier is thereby accommodated virtually without play.

BRIEF DESCRIPTION OF THE DRAWINGS

Further advantages are disclosed by the following description of the drawings. The drawings show exemplary embodiments of the disclosure. The drawing, the description and the claims contain numerous features in combination. Persons skilled in the art will expediently also consider the features individually and combine them to form further appropriate combinations.

FIG. 3a: Longitudinal section of a sub-region from FIG. 3.

FIG. 4a: Section of a side view of a sub-region from FIG. 5: Top view of an alternative embodiment of a hand-held power tool having a filter carrier.

FIG. 9a: Detail of a perspective view of an alternative embodiment of a filter carrier with a hand-held power tool.

FIG. 9b: Longitudinal section of an alternative embodiment of a filter carrier with a hand-held power tool.

DETAILED DESCRIPTION

Figure 1:
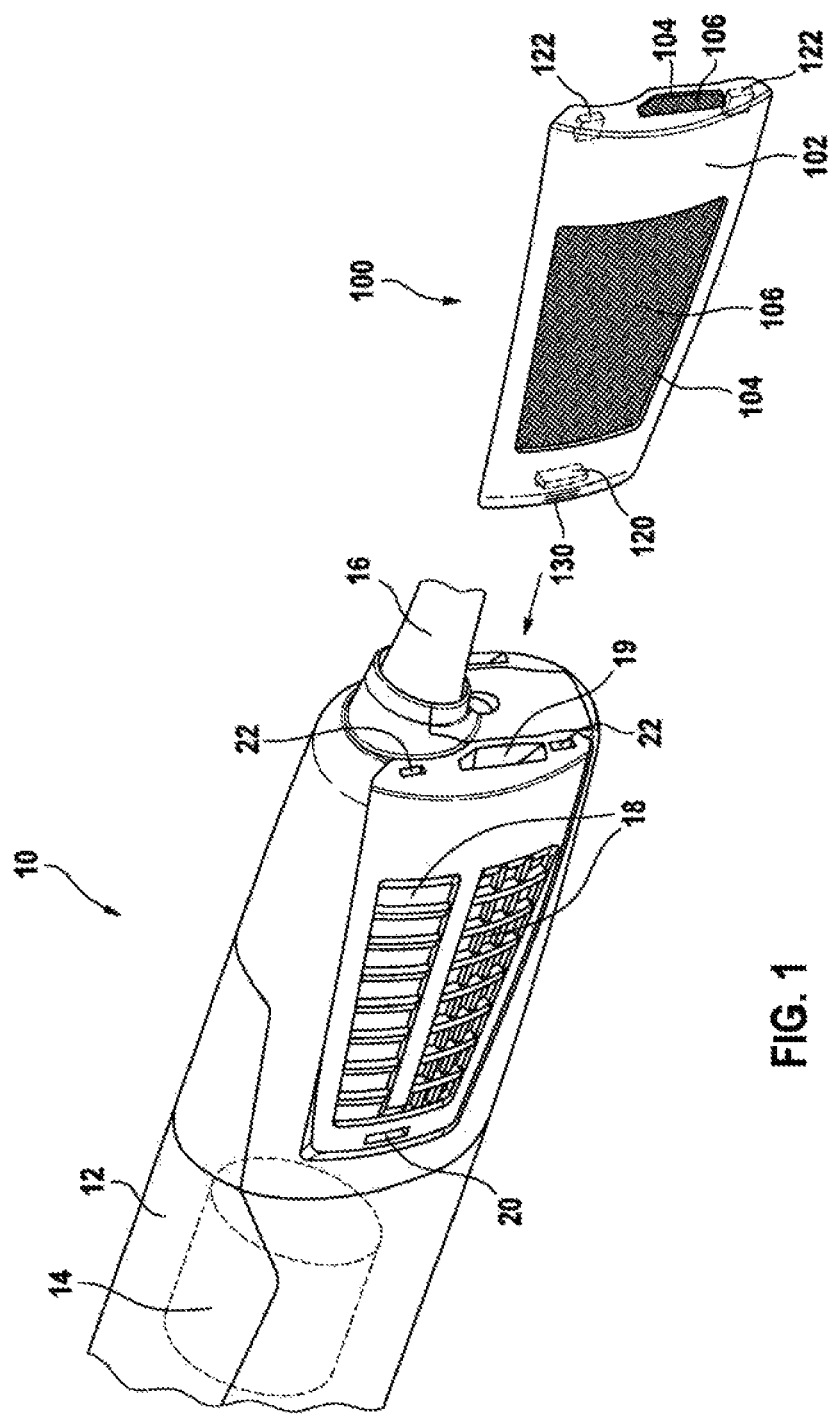
FIG. 1: Perspective view of a hand-held power tool according to the disclosure having a filter carrier.
Figure 2:
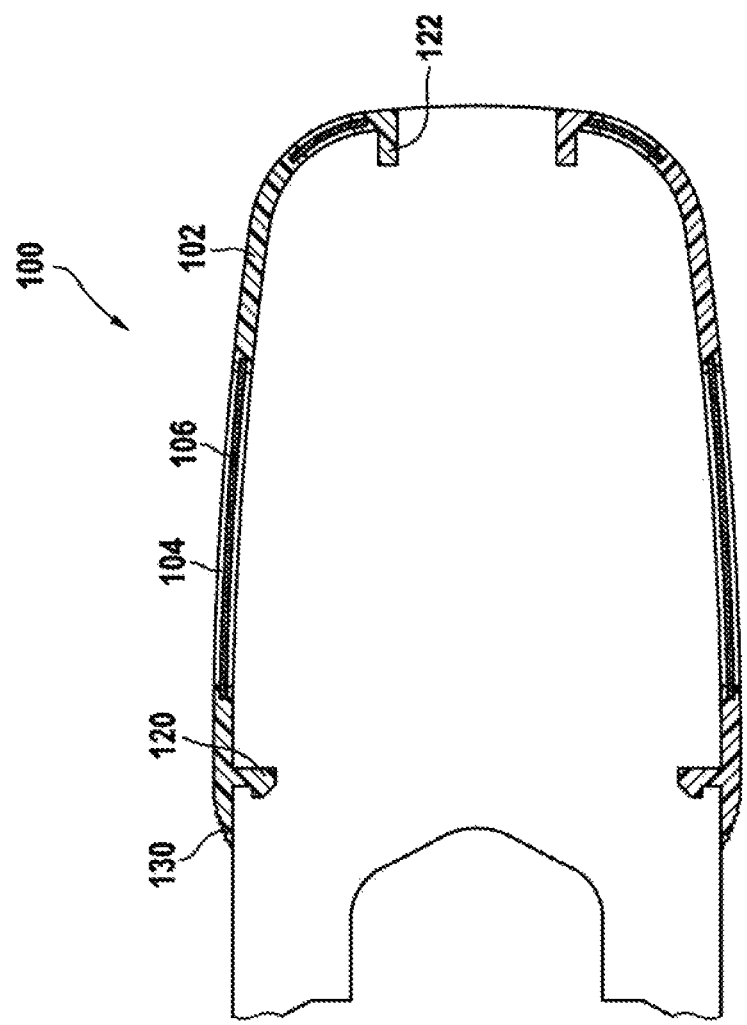
FIG. 2: Longitudinal section of a hand-held power tool according to the disclosure having a filter carrier.

Shown in FIG. 1 is a perspective view of a hand-held power tool 10 according to the disclosure having a filter carrier 100, the filter carrier 100 being attachable to the hand-held power tool 10 by a pivoting movement. A longitudinal section of the filter carrier 100 according to the disclosure is shown in FIG. 2. The hand-held power tool 10 is realized, exemplarily, as an angle grinder. The hand-held power tool 10 has a housing 12, in which an electric motor 14 is accommodated. The housing 12 is of an elongate, substantially cylindrical shape. Arranged at the rear of the housing of the hand-held power tool 10 is a bushing 16 that is provided as a receiver for a mains power cable, the mains power cable being electrically connected to the electric motor 14. On its outer circumferential surface, the housing 12 of the hand-held power tool 10 has at least one air inlet opening 18. The rear of the housing 12 of the hand-held power tool 10 exemplarily has at least one additional air inlet opening 19. For the purpose of fastening the filter carrier 100 to the hand-held power tool 10, the housing 12 of the hand-held power tool 10 has at least one first securing element 20 and at least one second securing element 22, in particular at least two second securing elements 22. The first securing element 20 is exemplarily arranged on the outer circumferential surface of the housing 12 of the hand-held power tool 10. The first securing element 20 of the hand-held power tool 10 is exemplarily realized as a latching receiving opening, realized such that it can be connected to a first actuating element 120 of the filter carrier 100. The second securing element 22 of the hand-held power tool 10 to exemplarily arranged on the rear of the housing 12 of the hand-held power tool 10. Represented in the present embodiment are two second securing elements 22 of the hand-held power tool 10, realized such that they can be connected to two fastening elements 122 of the filter carrier 100. The second securing element 22 of the hand-held power tool 10 is exemplarily realized as an opening in the housing 12 of the hand-held power tool. The filter carrier 100 has a filter carrier element 102, the filter carrier element 102 comprising at least one receiving opening 102 that is designed to receive a filter element 106. The filter carrier element 102 of the filter carrier 100 is advantageously made of a dimensionally stable plastic. The filter elements 106 of the filter carrier 100 are preferably arranged in such a manner that they substantially completely cover the air inlet openings 18, 19, in particular all air inlet openings 18, 19, in the housing 12 of the hand-held power tool 10. The filter carrier 100 has at least one first fastening element 120 and at least one second fastening element 122, in particular two second fastening elements 122. The first filter element 120 of the filter carrier 100 is exemplarily realized as a latching element in the form of a latching lug or a latching hook. The first filter element 120 of the filter carrier 100 is advantageously realized so as to be resilient. The first fastening element 120 is advantageously realized so as to be integral with the filter carrier element 102. The second fastening element 122 of the filter carrier 100 to exemplarily realized as a positive-engagement element, in particular as a hook-shaped element. The second fastening element 122 of the filter carrier 100 is advantageously realized so as to be integral with the filter carrier element 102. The first fastening element 120 and the second fastening element 122 of the filter carrier 100 are exemplarily arranged on opposite end regions of the filter carrier 100. End regions of the filter carrier 100 are to be understood to mean, in particular, the lateral edges of the filter carrier 100. The filter carrier 100 has an actuating unit 130, which is arranged on the first fastening element 120 of the filter carrier 100. The filter carrier 100 is realized such that it separably to the hand-held power tool 10 by an actuation of the actuating unit 130. In particular, the positive engagement or the latching connection of the first fastening element 120 of the filter carrier 100 to the first securing element 20 of the hand-held power tool 10 is separated by an actuation of the actuating unit 130. The connection of the filter carrier 100 to the hand-held power tool 10 is effected, firstly, by fastening the second fastening element 122 of the filter carrier 100 to the second securing element 22 of the hand-held power tool 10 by positive engagement. Following this, the first fastening element 120 of the filter carrier 100 is separably connected to the first securing element 20 of the hand-held power tool 10 by a pivoting movement. The first fastening element 120 of the filter carrier 100 is advantageously realized such that can be connected to the first securing element 20 of the hand-held power tool 10 by means of a positive engagement latching connection. The filter carrier 100 is advantageously closely fitted to the contour of the housing 12 of the hand-held power tool 10. In particular, the connection of the filter carrier 100 to the hand-held power tool 10 is effected automatically. Automatically is to be understood to mean, in particular, that an actuation of the actuating unit 130 of the filter carrier 100 is not required to connect the filter carrier 100 to the hand-held power tool 10.

Figure 3:
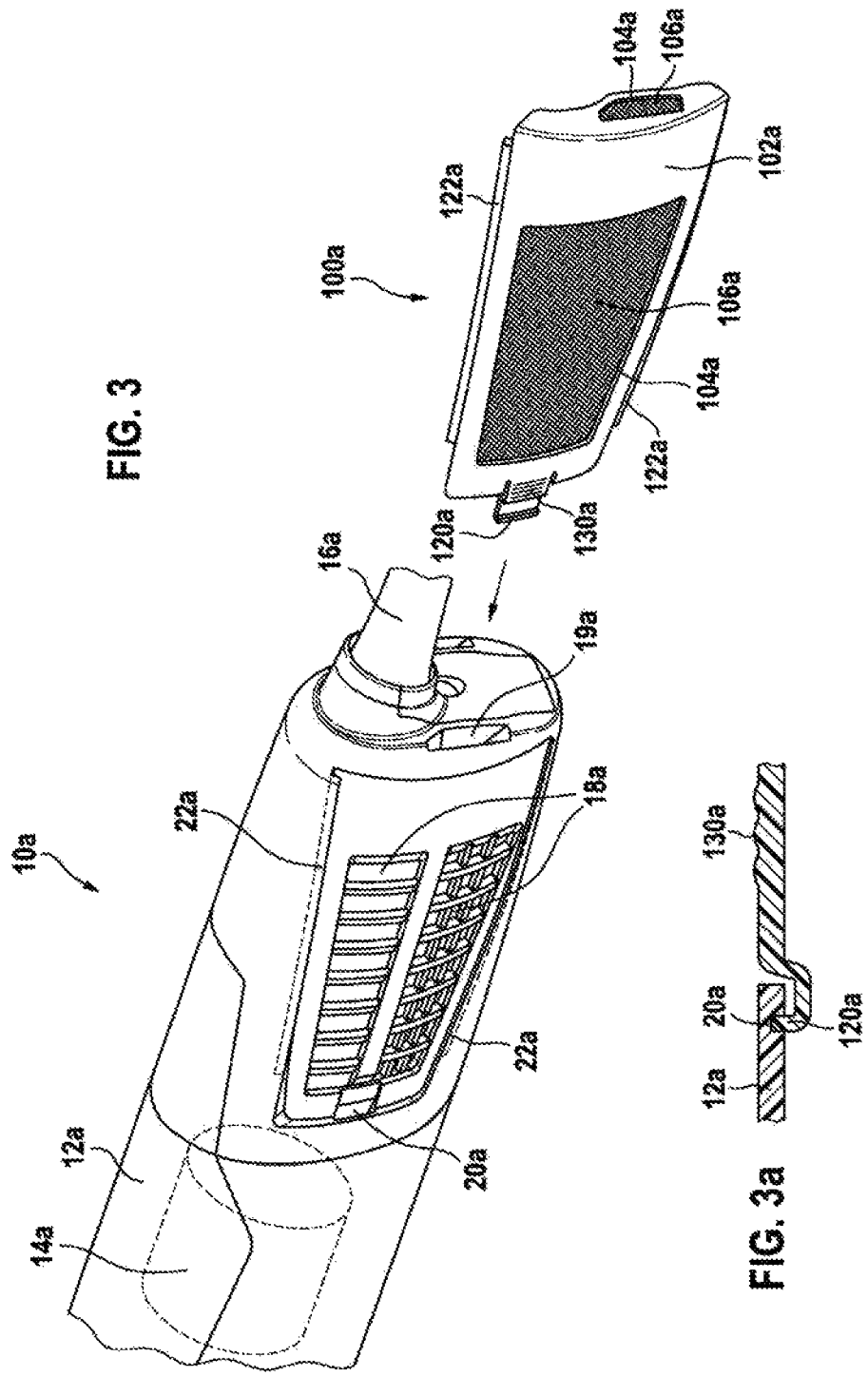
FIG. 3: Perspective view of an alternative embodiment of the hand-held power tool according to the disclosure having a filter carrier.

Shown in FIG. 3 is a perspective view of an alternative embodiment of the hand-held power tool 10a according to the disclosure having a filter carrier 100a, the filter carrier 100a being realized such that it can be connected to the hand-held power tool 10a substantially by means of a linear movement. This embodiment differs substantially from the first embodiment in the shape of the first and the second filter element 120a, 122a of the filter carrier 100a and their corresponding securing elements 20a, 22a on the hand-held power tool 10a, and the arrangement of the second fastening element 122a, in particular of the two second fastening elements 122a, of the filter carrier 100a. The first securing element 20a of the hand-held power tool 10a is exemplarily realized as a receiving pocket for a latching element. The securing element 20a of the hand-held power tool 10a is advantageously realized so as to correspond to the first fastening element 120a of the filter carrier 100a. In FIG. 3a, the fastening element 120a of the filter carrier 100a is shown, in a longitudinal section, separably connected to the securing element 20a of the hand-held power tool 10a. The first fastening element 120a can be slid linearly along the longitudinal extent of the hand-held power tool 10a, into the first securing element 20a of the hand-held power tool 10a, the first fastening element 120a of the filter carrier 100a being realized such that it can be connected to the first securing element 20a of the hand-held power tool 10a by means of a latching connection. Exemplarily, the latching arm 120a of the filter carrier 100a engages in the latching receiver 20a of the hand-held power tool 10a. By an actuation of the actuating unit 130a of the filter carrier 100, the actuating unit 130a being realized so as to be integral with the fastening element 120a, the connection between the fastening element 120a of the filter carrier 100a and the securing element 20a of the hand-held power tool 10a can advantageously be separated. The actuating unit 130a of the filter carrier 100a has, in particular, a distinguishing region, in particular a structured or fluted surface region, that is designed to indicate to the user the position at which the actuation is to be effected. The actuation is effected, in particular, by a radial force upon the actuating unit 130a of the filter carrier 100a in the direction of the hand-held power tool 10a. This has the result, in particular, that the latching connection between the latching arm 120a of the filter carrier 100a and the latching receiver 20a of the hand-held power tool 10a is separated, and the filter carrier 100a can be removed from the hand-held power tool 10a. The second securing element 22a of the hand-held power tool 10a, in particular the two second securing elements 22a, is/are exemplarily realized as a groove or a depression. The second securing elements 22a of the hand-held power tool 10a is designed to separably receive the second fastening element 122a of the filter carrier 100 in the form of a guide rail, or to separably connect to the second fastening element 122a. The guide rail may exemplarily be realized with a swallow-tail or T-groove profile. The second fastening element 122a may exemplarily be realized so as to be continuous, partial or segmented. The second fastening element 122a of the filter carrier 100a is designed, in particular, for radially fastening the filter carrier to the hand-held power tool. The second fastening element 122a of the filter carrier 100a is advantageously arranged at the end regions or lateral edges of the filter carrier 100a, which run parallel to the linear movement effected as the filter carrier 100a is being applied to the hand-held power tool 10a. The first fastening element 120a of the filter carrier 100a is advantageously arranged at an end region, in particular a lateral edge, of the filter carrier 100a, the end region of the first fastening element 120a running substantially orthogonally in relation to the end region at which the second fastening element 122a of the filter carrier 100a is arranged.

Figure 4:
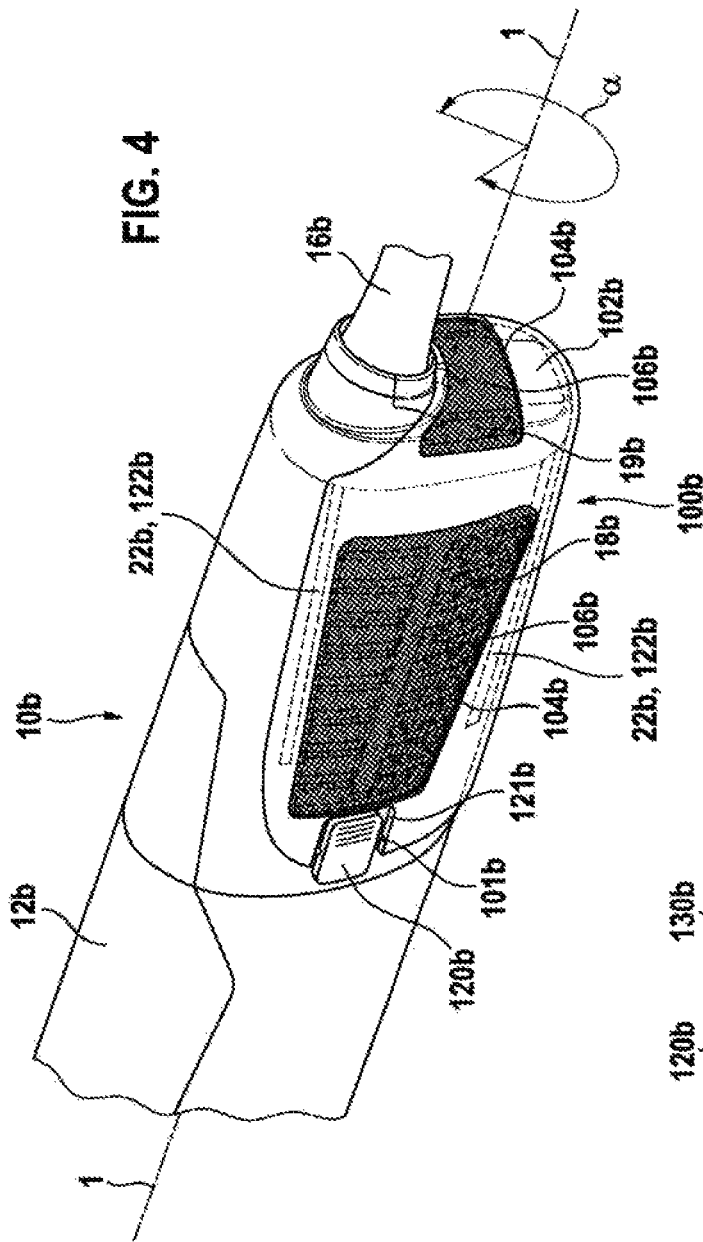
FIG. 4: Perspective view of a further alternative embodiment of the hand-held power tool according to the disclosure having a filter carrier.

An alternative embodiment of the hand-held power tool 10b having a filter carrier 100b is shown in FIG. 4. The filter carrier 100b is realized such that it can be separably fastened to the housing 12b of the hand-held power tool 10b. The filter carrier 100b is exemplarily realized as a substantially shell-shaped and/or contour-matched attachment. In particular, the filter carrier 100b may also be realized in a U shape. The filter carrier 100b at least partially encompasses the outer circumferential surface of the housing 12b of the hand-held power tool 10b, exemplarily an angular range α of from 180° to 360°, in particular 260° to 2190°, quite particularly 270°, around the longitudinal extent of the hand-held power tool 10b, in particular around the longitudinal extent of the housing axis 1 of the hand-held tool 10b. The angular range α is indicated schematically in FIG. 4. Advantageously, the filter carrier 100b may also be of a substantially completely closed shape, in other words an angular range α of 360° around the longitudinal extent of the hand-held power tool 10b may be surrounded by the filter carrier. In addition, the filter carrier attachment 100b is arranged, at least partly, at the rear of the hand-held power tool 10b. The filter carrier 100b is designed substantially to cover the air inlet openings 18b, 19b of the hand-held power tools with the filter elements 106b accommodated in the receiving openings 104b, and thus to protect them against ingress of dust particles, material particles and magnetisable particles. For the purpose of separably connecting the filter carrier attachment 100b to the hand-held power tool 10b, the filter carrier 100b has at least one first fastening element 120b and at least one second fastening element 122b. The filter carrier 100b can be applied to the hand-held power tool 10b, in particular slid on, in the axial direction. The application of the filter carrier 100b is guided, in particular, by means of two fastening elements 122b, in particular guide elements or guide rails. The hand-held power tool 10b has corresponding second securing elements 22b, in which the second filter elements 122b of the filter carrier 100b engage. The second fastening element 122b of the filter carrier 100b is exemplarily arranged on the radially inner lateral surface of the filter carrier 100, the lateral surface of the filter carrier 100 impinging on the hand-held power tool 10b. Exemplarily, the second fastening elements 122b of the filter carrier 100b are arranged in the vicinity, in particular in the immediate vicinity, of an end region of the filter carrier 100b, or adjacently to the end region, in particular immediately adjacently. At the end-face end region of the filter carrier 100b, the first fastening element 120b of the filter carrier 100b is arranged in an opening 121b of the filter carrier element 102b. In particular, the first fastening element 120b is arranged in such a manner that, when the filter carrier 100b is in the fastened state on the hand-held power tool 10b, the filter carrier 100b latches into the first securing element 20b of the hand-held power tool 10b. Arranged in the opening 121b of the filter carrier element 102b is a rotary axis 101b in the form of a transverse web, which exemplarily is realized so as to be integral with the filter carrier element 102b. FIG. 4a slows a section of a side view of the first fastening element 120b of the filter carrier and of the first securing element 20b of the hand-held power tool 10b. The first fastening element 120b of the filter carrier element exemplarily realized as a latching element and is connected to the transverse web 101b. The transverse web 101b impinges on the outer circumferential surface of the housing 12b of the hand-held power tool 10b. The first fastening element 120b of the filter carrier 100b is realized such that it can be separably connected, by means of a latching connection, to the first securing element 20b of the hand-held power tool 10b, for example realized as a latching receiver. The rotary axis 101b of the filter carrier element 102b is spatially arranged, exemplarily, between the latching lug of the first fastening element 120b and the actuating unit 130b of the filter carrier 100b. The actuating unit 130b of the filter carrier 100b is exemplarily realized so as to be integral with the first fastening element 120b of the filter carrier 100b. Owing to the transverse web 101b, the actuating unit 130b of the filter carrier 100b is arranged at a distance from the housing 12b of the hand-held power tool 10b. Owing to the arrangement of the transverse web 101b of the filter carrier element 102b, a radial force acts, in the direction of the housing 12b of the hand-held power tool 10b, upon the actuating unit 130b of the filter carrier 100b, like a lever upon the first actuating unit 120b of the filter carrier 100b, as a result of which the latter can be separated from its latching connection.

Figure 5:
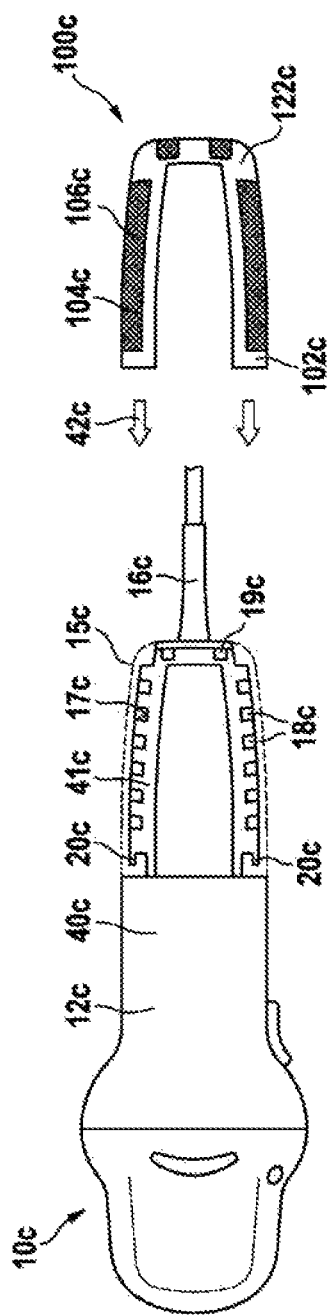
FIG. 5a: Side view of an alternative embodiment of a hand-held power tool having a filter carrier.
FIG. 5b: View, through the plane B, of the end face of a filter carrier.
FIG. 5c: View, through the plane A, of the rear of a filter carrier.
FIG. 5d: Detail of a cross section of the filter carrier.
FIG. 5e: Top view of an alternative embodiment of a hand-held power tool having a filter carrier.
Figure 5A:
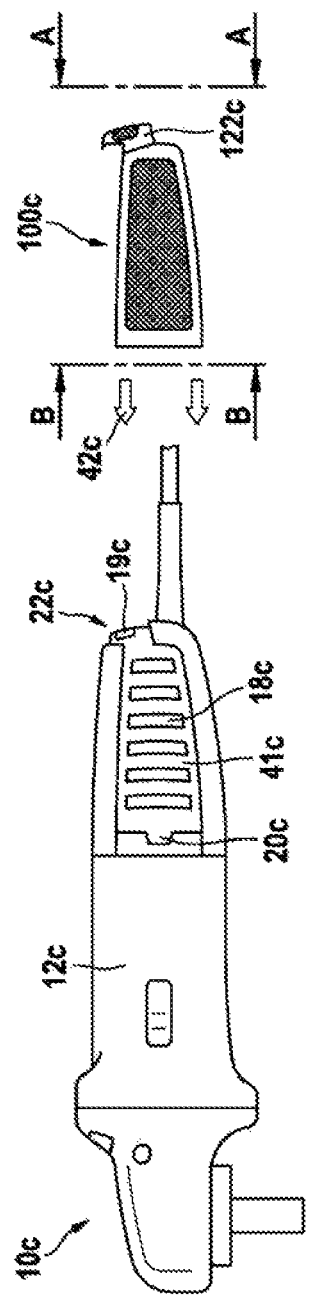

A top view of an alternative embodiment of a hand-held power tool 10c having a filter carrier 100c is shown in FIG. 5, the associated side view being shown in FIG. 5a. FIG. 5b shows the front of the filter carrier 100c, the rear of the filter carrier 100c being shown in FIG. 5c. The filter carrier 100c is realized such that it can be separably fastened to a hand-held power tool 10c. The housing 12c of the hand-held power tool 10c may have at least a motor housing 40c and a housing cover 41c. The housing cover 41c of the hand-held power tool 10c in this case comprises the rear of the hand-held power tool 10c on which the bushing 16c is arranged. On its outer circumferential surface, the housing cover 41c has at least one air inlet opening 18c and, on its rear, at least one air inlet opening 19c. The housing cover 41c may have first securing elements 20c, for example studs, in the axial longitudinal extent of the hand-held power tool 10c, in particular lying inside an overall outer contour 15c. The first securing element 20c of the hand-held power tool 10c is realized, in particular, such that it can be encompassed by a first fastening element 120c of the filter carrier 100c. The housing cover 41c of the hand-held power tool 10c, in the region of the air inlet openings 18c, has an outer surface 17c that is set back from the continuous housing outer contour 15c. The filter carrier 100c is fastened axially to the hand-held power tool 10c in the direction of application 42c. The filter carrier 100c is realized such that it can be fastened to the hand-held power tool 10c by means of at least one first fastening element 120c, in particular two fist fastening elements 120c, and at least one second fastening element 122c. The two first fastening elements 120c of the filter carrier 100c are exemplarily realized as hole tabs (see FIG. 5b). The second securing element 22c of the hand-held power tool 10c is realized as an elastic fastening element, in particular of an elastic rear wall of the hand-held power tool 10c (see FIG. 5c). The elastic second fastening element 122c of the filter carrier 100c is designed, in particular, to bias the filter carrier 100c. The second fastening element 122c is biased, in particular, against a second securing element 20c of the hand-held power tool 10c, realized as a rear wall of the hand-held power tool 10c. The filter carrier 100c is realized such that, as the filter carrier 100c is being applied to the hand-held power tool 10c along the direction of application 42c, it can be biased contrary to the direction of application by means of the elastic fastening element 122c. In the fastened state, the filter carrier 100c is held in its position by the biasing. As a result of the biasing, the filter carrier 100c is realized such that it can be separably fastened, substantially without play, to the hand-held power tool 10c. In particular, the filter element 106c of the filter carrier 100c may also be realized so as to be elastic (represented in FIG. 5d). Exemplarily, the filter element 106c of the filter carrier 100c may be corrugated, such that it is possible for the filter element to be stretched or deformed. In FIG. 5e, the filter carrier 100c is shown fastened to the hand-held power tool 10c. In particular, the filter carrier 100c joins in a flush manner into the housing outer contour 15c of the housing cover 41c. In the fastened state, the system composed of the hand-held power tool 10c and the filter carrier 100c has a gap 131c between the filter carrier element 102c of the filter carrier 100c and the housing 12c of the hand-held power tool 10c. The gap 131c makes it easier for a user to separate the connection of the filter carrier 100c to the hand-held power tool 10c, the separation of the connection being effected by sliding forward, widening and withdrawing the filter carrier 100c from the hand-held power tool 10c.

Figure 6:
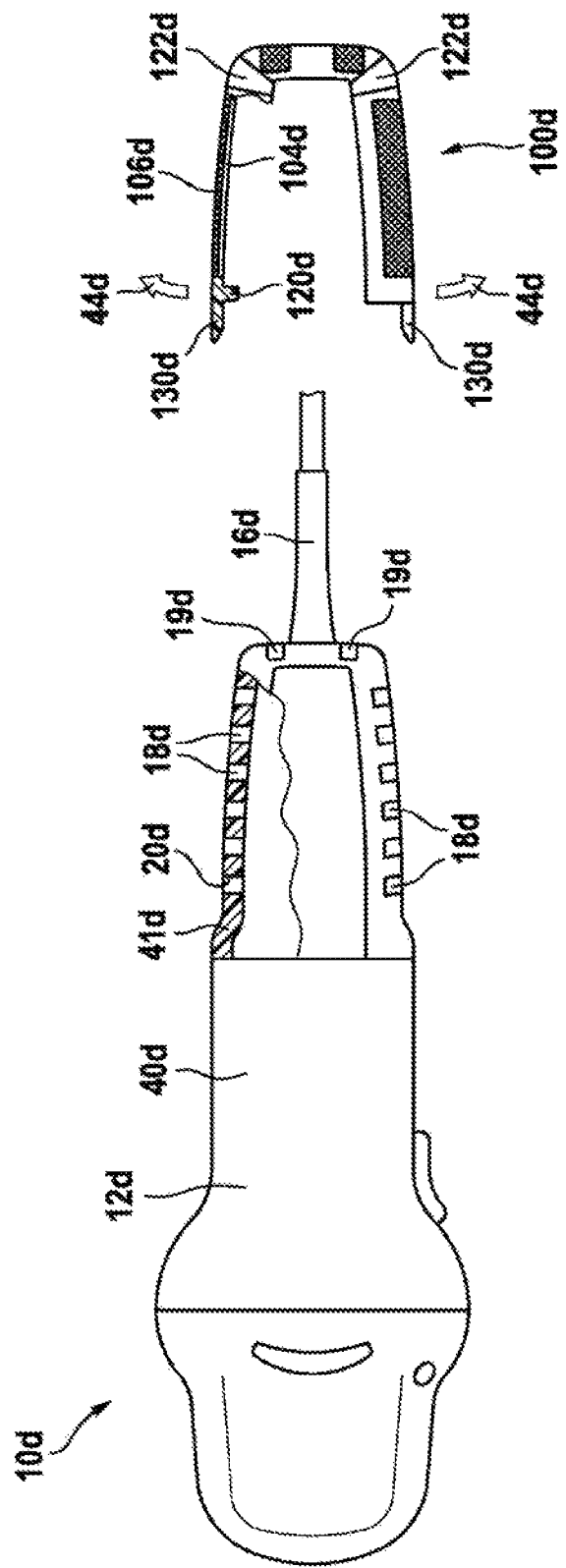
FIG. 6: Top view of an alternative embodiment of a hand-held power tool having a filter carrier.

Shown in FIG. 6 is a top view of an alternative embodiment of a hand-held power tool 10d having a filter carrier 100d. This embodiment differs from the previous embodiment substantially in the fastening elements 120d, 122d of the filter carrier and the first securing element 20d of the hand-held power tool 10d. Exemplarily, a lateral wall of the air inlet opening 18d is realized as a first securing element 20d of the hand-held power tool 10d. The first fastening element 120d of the filter carrier 100d is exemplarily realized as a hook-shaped element extending radially in the direction of the hand-held power tool 10d. The second fastening element 122d is realized, in particular, as an element that is elastic in the direction in which the filter carrier 100d is applied to the hand-held power tool 10d. Owing to the second elastic fastening element 122d, the filter carrier 100d is biased as it is applied to the hand-held power tool 10d. The first fastening element 120d of the filter carrier 100d engages in an air inlet opening 18d of the hand-held tool 10d, and impinges on the first securing element 20d of the hand-held tool 10d, in particular a lateral wall of the hand-held tool 10d. The first fastening element 120d of the filter carrier 100d is held or supported in its position in the air inlet opening 18d of the hand-held power tool 10d by the biasing due to the second fastening element 122d of the filter carrier 100d. For the purpose of separating the fastening of the filter carrier 100d to the hand-held power tool 10d, the filter carrier 100d has an actuating unit 130d in the form a holding geometry or holding element. The actuating unit 130*d* may advantageously be arranged in the region of the first fastening element 120*d* of the filter carrier 100*d*. The actuating unit 130*d* is advantageously realized so as to be integral with the filter carrier 100*d*. The filter carrier 100*d* is realized such that it can be withdrawn, by an actuation of the actuating unit 130*d* of the filter carrier 100*d*, by means of a movement 44*d* directed radially in relation to the longitudinal extent of the hand-held power tool 10*d*.

Figure 7A:
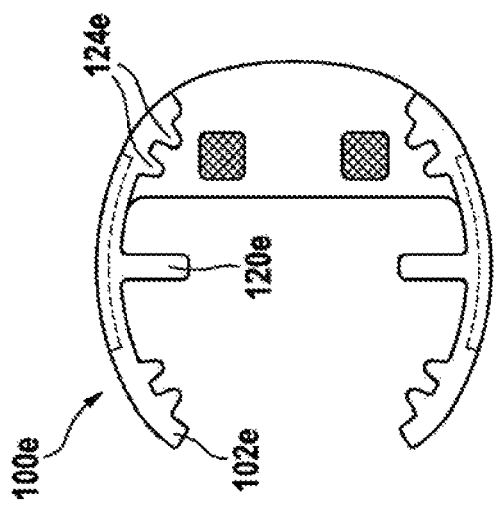
FIG. 7a: Rear of an alternative embodiment of a fitter carrier.
Figure 7B:
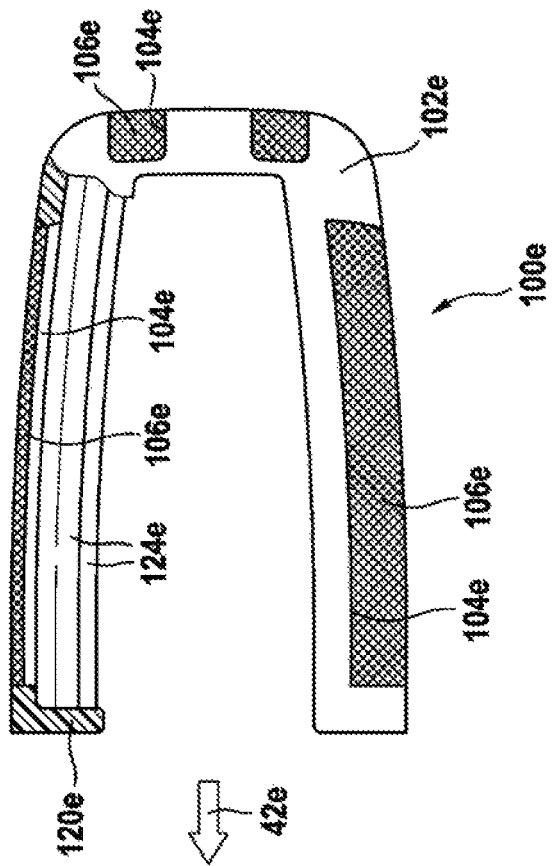
FIG. 7b: Side view of an alternative embodiment of a filter carrier.

A rear of an alternative embodiment of a filter carrier 100*e* is shown in FIG. 7*a*, and a side view of the filter carrier 100*e* is shown in FIG. 7*b*. The filter carrier 100*e* is realized, in particular, such that it can be separably fastened to a hand-held power tool 100*d*, as described previously. The filter carrier element 102*e* may exemplarily be made of a low-flexibility material, in particular TPE. The filter carrier element 102*e* has a particular geometry, in particular longitudinal ribs 124*e*, by which the filter carrier 100*e* is realized so as to be sufficiently flexurally stable to form a stable unit with the housing outer contour of the hand-held tool 100*d*. Furthermore, the filter carrier is realized so as to be elastically deformable in the direction of application 42, in order to generate a bias. The first fastening element 120*e* of the filter carrier 100*e* is exemplarily realized as a hook-shaped element. The receiving openings 104*e* of the filter carrier, with the filter element 106*e*, are fixedly produced in a forming process, for example injection molding, and in particular are realized so as to be smaller than the air inlet openings 18*d* of the hand-held power tool 10*d*, in order to achieve a filter effect.

Figure 8A:
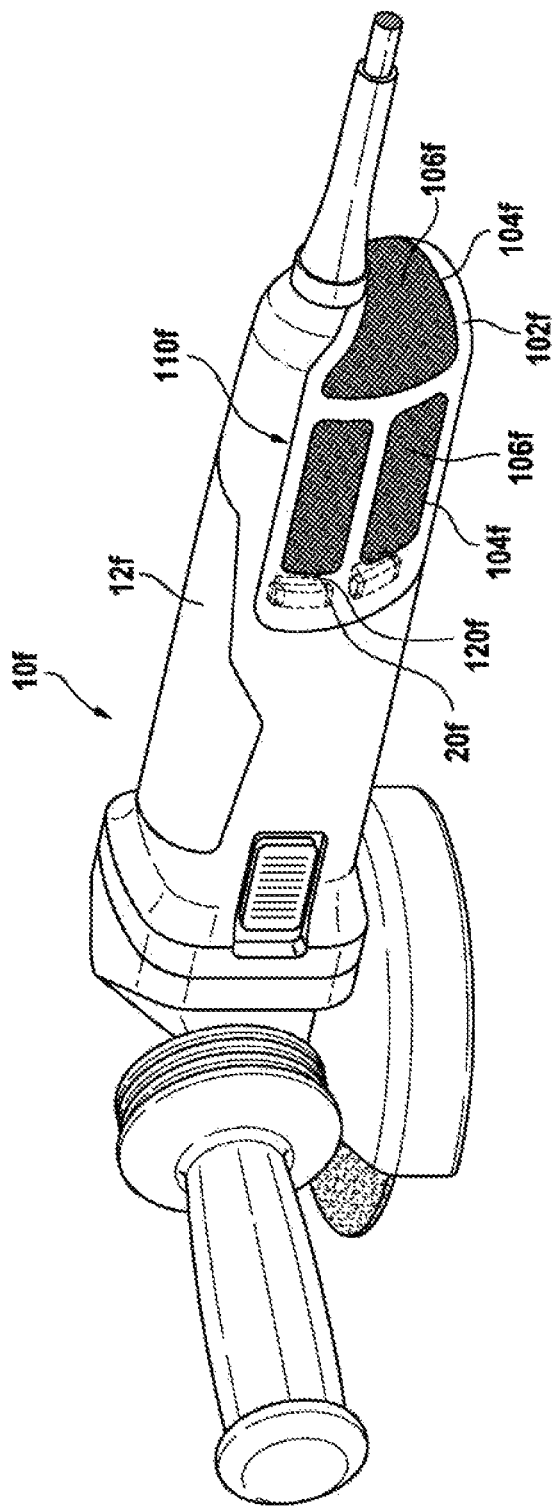
FIG. 8a: Perspective view of an alternative embodiment of a a filter carrier of a hand-held power tool.
Figure 8C:
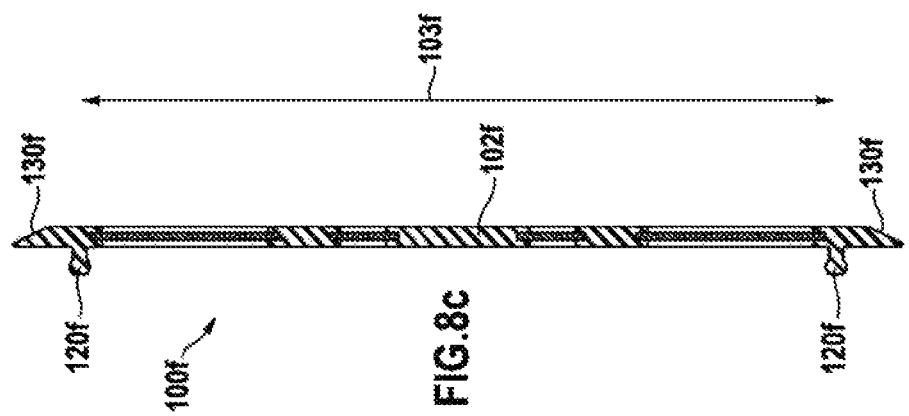
FIG. 8c: Section of a side view of an alternative embodiment of a filter carrier.
Figure 8B:
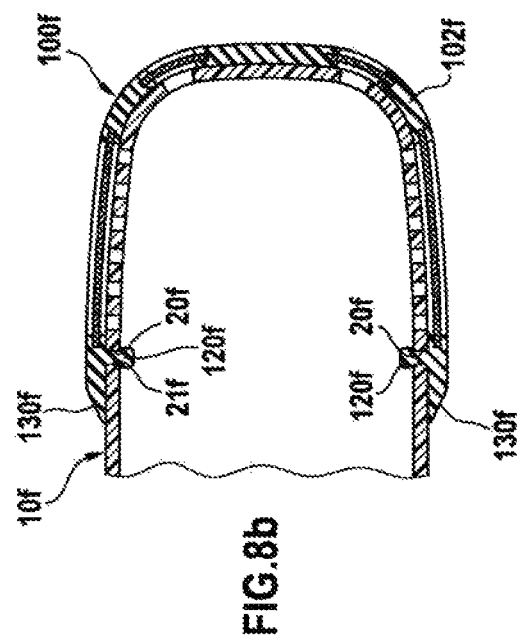
FIG. 8b: Cross section of an alternative embodiment of a filter carrier on a hand-held power tool.

Shown in FIG. 8*a* is a perspective view of an alternative embodiment of a filter carrier 100*f*, which can be separably fastened to a hand-held power tool 10*f*. A cross section of the filter carrier 100*f* is shown in FIG. 8*b*. The filter carrier 100*f* is exemplarily realized in a U shape. The filter carrier 100*f* may advantageously be realized as two pieces, composed of a filter carrier element 102*f* and at least one filter element 106*f*. The filter carrier element 102*f* may exemplarily be made of rubber, TPE, silicone or another soft and/or elastic plastic. Advantageously, the filter carrier 100*f* may encompass the hand-held power tool 10*f* at the rear of the hand-held power tool 10*f*. The filter carrier 100*f* may advantageously be made of a high-flexibility material. In particular, the filter carrier 100*f* is realized so as to be elastically deformable, in such a manner that, in the non-fastened state, it can assume substantially any shape. Exemplarily, in the non-fastened state the filter carrier 100*f* is of a substantially linear shape (represented in FIG. 8*c*). The filter carrier 100*f* has at least one receiving opening 104*f*, in which at least one filter element 106*f* is accommodated. The receiving openings 104*f* of the filter carrier 100*f* are advantageously arranged in the region of the air inlet openings in the housing 12*f* of the hand-held power tool 10*f*. For the purpose of fastening the filter carrier 100*f* to the hand-held power tool 10*f*, the filter carrier 100*f* has at least one first fastening element 120*f*, in particular two first fastening elements 120*f*. The first fastening element 120*f* of the filter carrier 100*f* is exemplarily realized as a positive-engagement element, in particular a latching element, that is designed to engage in at least one first securing element 20*f* securing element 20*f* of the hand-held power tool 10*f*, in particular a through-hole, a depression or the like, corresponding to the fastening element, and thus to effect fastening of the filter carrier 100*f* to the hand-held power tool 10*f*. The first fastening element 120*f* of the filter carrier 100*f* may be made of a high-flexibility material and/or be integral with the filter carrier 100*f*. The first fastening element 120*f* is realized so as to be elastically deformable, in such a manner that it alters its shape when being applied to the hand-held power tool 10*f*. Exemplarily, the first fastening element 120*f* of the filter carrier 100*f* is realized as a positive-engagement element in a T shape, and the first securing element 20*f* of the hand-held power tool 10*f* is realized as a groove having a T profile. When the filter carrier 100*f* is being applied to the hand-held power tool 10*f*, the first fastening element 120*f* of the filter carrier 100*f* is compressed in such a manner that it can be moved through the gap 21*f* and can then, upon positive engagement, assume the T shape again. Advantageously, the first fastening element 120*f* is arranged at two opposite end regions of the filter carrier element 102*f* of the filter carrier 100*f*. In particular, the filter carrier is realized so as to be elastically deformable, along its longitudinal extent 103*f*, by a value of 15%, advantageously by 25%, and further advantageously by 50%, relative to its length in the non-tensioned state. For this purpose, the filter carrier element 102*f* is realized, in particular, to absorb the forces that occur upon tensioning or stretching of the filter carrier 100*f* along its longitudinal extent 103*f*. The filter carrier element 102*f* exemplarily has a Shore A hardness of 30 to 75, in particular of 40 to 65, and advantageously of 55. Furthermore, the filter carrier element 102*f* may have a tear resistance of 0.5 to 4.5, advantageously of 1.5 to 3.5, and further advantageously of 2.2 (specified in MPa).

In the fastened state, the filter carrier 100*f* is slightly tensioned; in particular, its longitudinal extent 103*f* is at least 5% longer than in the non-tensioned state. The fastening of the filter carrier 100*f* to the hand-held power tool 10*f* is effected firstly by means of the first fastening elements 120*f* at an end region of the filter carrier 100*f*, the filter carrier 100*f* being substantially in a non-tensioned state. For the purpose of additionally fastening the first fastening elements 120*f* at the opposite end region of the filter carrier 100*f*, the filter carrier 100*f* must advantageously be biased in the direction of its longitudinal extent 103*f*. Advantageously, the tensioned filter carrier 100*f* is realized such that it can be fastened substantially without play to the hand-held power tool 10*f*. Substantially without play is to be understood to mean, in particular, that a slight gap, in particular no gap, is realized between the filter carrier 100*f* and the hand-held power tool 10*f*. Alternatively, the filter carrier 100*f* may additionally be received in a tongue/groove guide, the tongue/groove guide constituting substantially a labyrinth for the air, and thereby producing a better sealing effect. Furthermore, the filter carrier 100*f* may have a second filter element, or the hand-held power tool 10*f* may have a second securing means such as, for example, a depression for insertion, or ribs on the housing 12*f* of the hand-held power tool 10*f* for guiding, which assist the positioning, fixing and sealing of the filter carrier 100*f* on the hand-held power tool 10*f*. Advantageously, the filter carrier 100*f* has at least one actuating unit 130*f*, a tensile force on the actuating unit 130*f* facilitating the separation of the filter carrier 100*f* from the hand-held power tool 10*f*.

Shown in FIG. 9*a* is a detail of a perspective view and a longitudinal section of an alternative embodiment of a filter carrier 100*g* with a hand-held power tool 10*g*. As in the previous embodiment, the filter carrier 100*g* is made of a high-flexibility material and realized such that it can be separably fastened to a hand-held tool 10*g*. The substantial differences in relation to the preceding embodiment of the filter carrier 100*g* and of the hand-held power tool 10*g* consist in the fastening. The first fastening element 120*g* of the filter carrier 100*g* is exemplarily realized as a flexible receiving opening, in particular a clamping opening. The clamping opening is exemplarily realized such that it can be fastened to a first fastening element 120g of the hand-held power tool 10g. The filter carrier 100g has, in particular, four first fastening elements 120f, respectively two being arranged on opposite end regions of the filter carrier 100f. Furthermore, the hand-held power tool 10g has at least one second securing element 22g in the form of a guide, exemplarily an axial groove. The guide is designed to receive a second fastening element 122g of the filter carrier, in particular a rubber cap in the housing cover. The rubber cap may be clamped onto the hand-held power tool 10g, in particular by means of the clamping lug.

Figure 10:
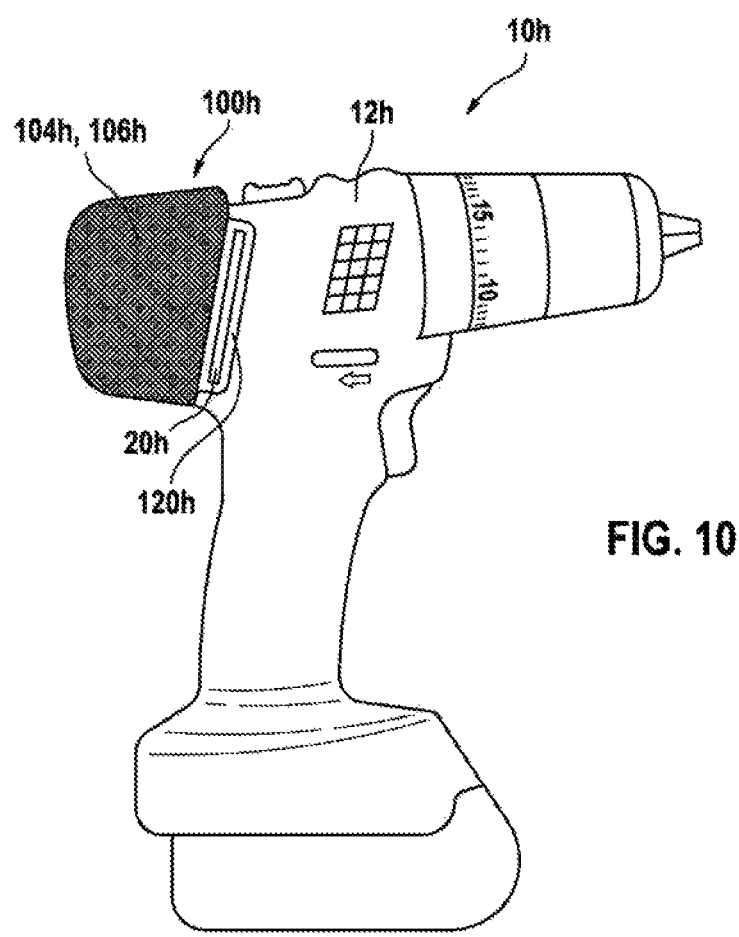
FIG. 10: Perspective view of an alternative embodiment, of a filter carrier on a hand-held power tool.

In FIG. 10 a perspective view of an alternative embodiment of a filter carrier 100h can be separably fastened to a hand-held power tool 10h. The hand-held power tool 10h is exemplarily realized as a hammer drill. The filter carrier 100h has a first fastening element 120f, in particular a positive-engagement element, advantageously a shackle, that is designed to separably fasten the filter carrier 100h to a first securing element 20h, in particular a positive-engagement element, advantageously a protuberance, of the hand-held power tool 10h. The filter carrier 100h is exemplarily realized substantially as a cap, and encompasses the hand-held power tool 10h by bearing closely against it, in particular substantially without play. Alternatively, for the purpose of fastening to larger hand-held power tools, the filter carrier 100h may have more than 2, in particular 4, fastening elements 120h.

Further exemplary embodiments of the present teachings include the following, but are not limited thereto:

1) In one embodiment, the hand-held power tool may be realized with a housing and with a filter carrier, the filter carrier comprising a filter carrier element having at least one receiving opening that is designed to receive a filter element, and the filter carrier having at least one first fastening element for separably fastening the filter carrier to the hand-held power tool by positive and/or non-positive engagement, the filter carrier element being made of a high-flexibility material, and the filter carrier element being deformable in such a manner that the length of the longitudinal extent of the filter carrier in the fastened state is at least lengthened relative to the length of the longitudinal extent in the non-fastened state.

2) In a development of the embodiment according to 1), the filter carrier may be realized so as to be elastically deformable along its longitudinal extent 103f by a value of 15%, advantageously by 25%, and further advantageously by 50%, relative to its length in the non-tensioned state.

3) In a development of the embodiment according to 1) or 2), the first fastening element of the filter carrier may be realized as a latching element or a positive-engagement element, in particular a shackle or a clamping opening, 4) In a development of the embodiment according to 1) to 3), the filter carrier may have a second fastening element, in particular a guide element.

5) In development of the embodiment according to 1) to 4), the filter carrier may be realized substantially in the shape of a U or as a cap.

Figure 11:
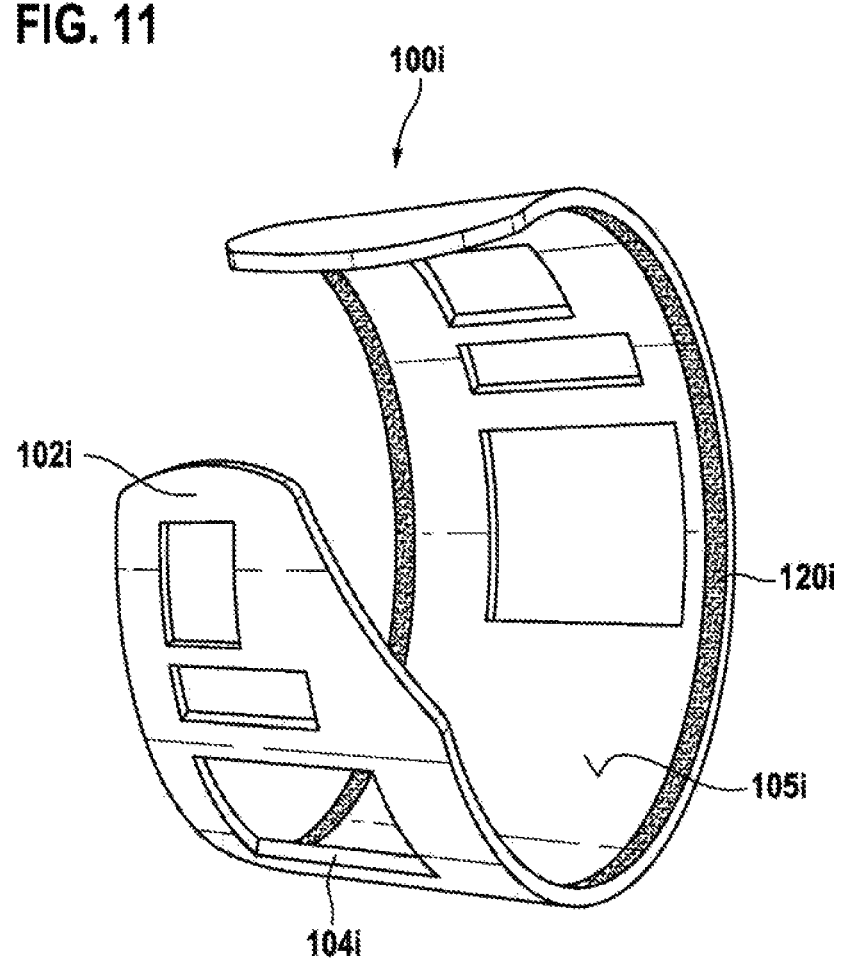
FIG. 11: Perspective view of an alternative embodiment of a filter carrier.

Shown in FIG. 11 is a perspective view of an alternative embodiment of a filter carrier 100i, which is realized such that it can be separably fastened to a hand-held power tool, as previously described. The filter carrier 100 has a filter carrier element 102i, which exemplarily may be made of a low-flexibility material. The filter carrier 100i is advantageously designed to encompass a hand-held power tool, at least partially, in particular partially, on the outer circumferential surface of the housing of the hand-held power tool.

The filter carrier 100i has at least one receiving opening 104i, which is designed to receive a filter element (not represented). Furthermore, on a lateral surface 105i that impinges on the hand-held power tool, in particular the inner lateral surface 105i, the filter carrier 100i has at least one first fastening element 120i, which is designed to separably fasten the filter carrier 100i to at least one first securing element of the hand-held power tool. Exemplarily, the first fastening element 120i of the filter carrier 100i is realized as an element of a hook-and-loop connection, in particular a hook-shaped element or a loop element. The first securing element of the hand-held power tool is advantageously realized as the corresponding element, such that a high-tensile and substantially dust-tight and/or air-tight fastening of the filter carrier 100i to a hand-held power tool can be realized. The first fastening element 120i of the filter carrier 100i is advantageously arranged along the edge region on the inner lateral surface 105i of the filter carrier. The first fastening element 120i may be connected to the filter carrier 100i by adhesive bonding or in another way. The first fastening element 120i of the filter carrier 100i may be formed from the filter element.

1) In one embodiment, the hand-held power tool may be realized with a housing and with a filter carrier, the filter carrier comprising a filter carrier element having at least one receiving opening that is designed to receive a filter element, and the filter carrier having at least one first fastening element for separably fastening the filter carrier to the hand-held power tool by positive and/or non-positive engagement, the first fastening element of the filter carrier being realized as an element of a hook-and-loop connection, and the filter carrier element being provided from a low-flexibility plastic material that at least partially encompasses the outer circumferential surface of the housing of the hand-held power tool.

Figure 12:
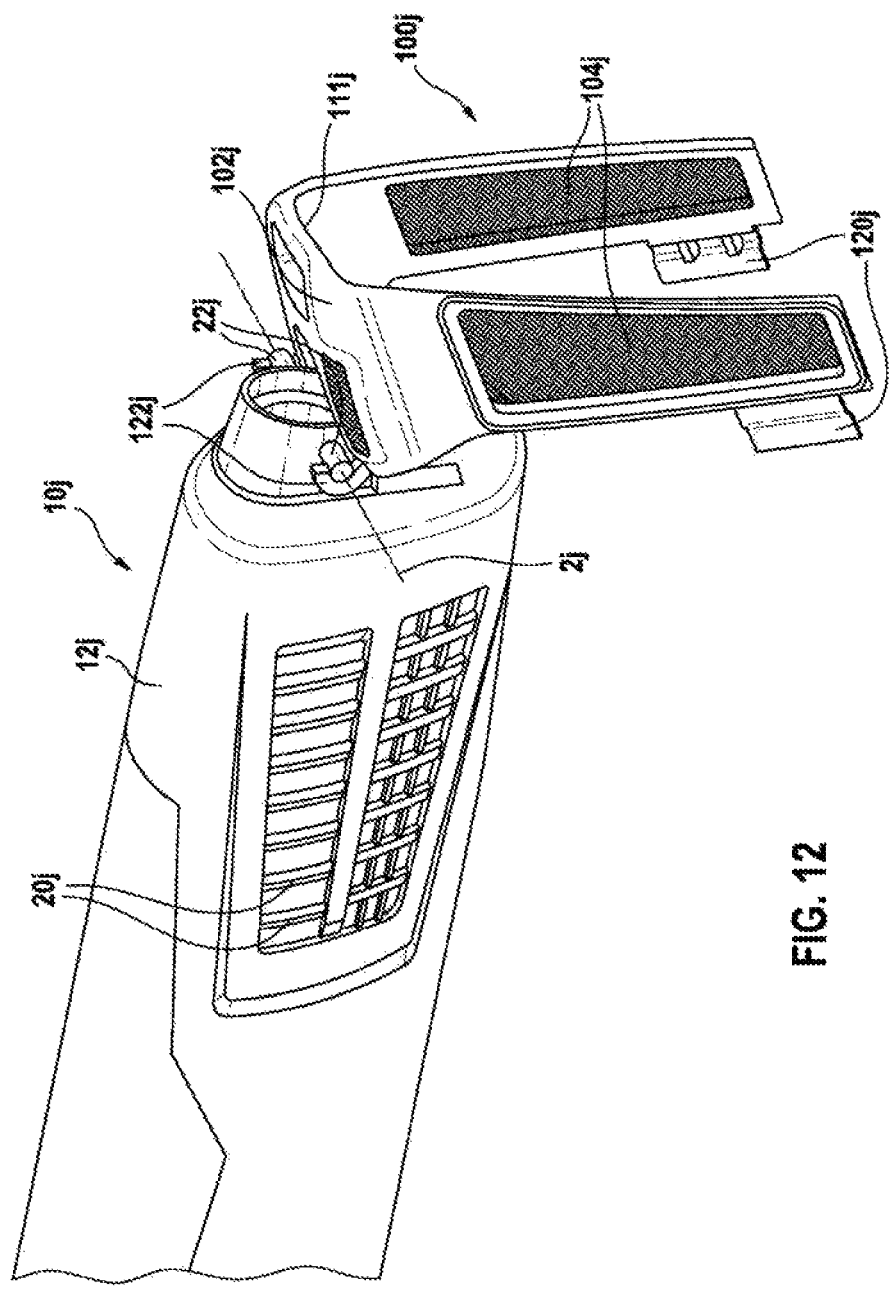
FIG. 12: Perspective view of an alternative embodiment of a filter carrier.
Figure 12A:
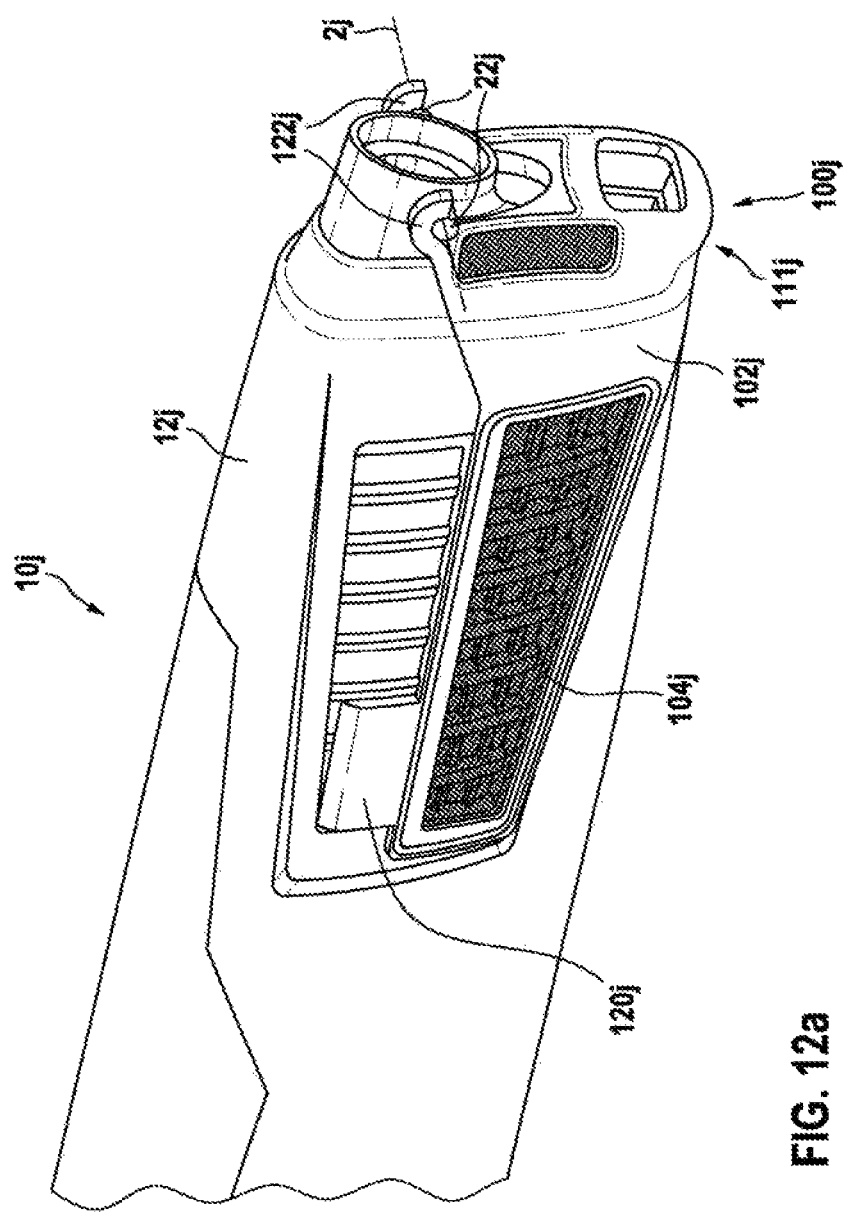
FIG. 12a: Perspective view of an alternative embodiment of a filter carrier according to FIG. 12, in the fastened state.

A perspective view of an alternative embodiment of a filter carrier 100j in the mounted state is shown in FIG. 12, and shown in FIG. 12a in the state of having been fastened to the hand-held power tool 10j. The filter carrier element 102j of the filter carrier 100j is made of a dimensionally stable plastic, and realized so as to be closely contoured to the housing 12j of the hand-held power tool 10j. The filter carrier element 102j of the filter carrier 100j is realized in a U shape and, at its respectively opposite end regions, has two first fastening elements 120j and two second fastening elements 122j. The second fastening element 122j is realized as a hook-shaped pivot bearing element. Owing to the hook-shaped pivot bearing element, the filter carrier 100j is realized such that it can be mounted on a second securing element 22j of the hand-held power tool 10j. The second securing element 22j of the hand-held power tool 10j is exemplarily realized as a stud formed onto the housing 12j. Advantageously, the second securing element 22j of the hand-held power tool 10j is arranged at the rear end of the hand-held power tool 10j, in particular in the region of a bushing receiver. The second securing element 22j of the hand-held power tool 10j is advantageously realized as a rotary joint. The second securing element 22j forms a rotary axis 2j, which is defined by the housing 12j of the hand-held power tool 10j and about which the filter carrier 100j can be pivotally attached to the hand-held power tool 10j.

For the purpose of fastening the filter carrier 100j to the hand-held power tool 10j, the filter carrier 100j is pivoted about the rotary axis 2j, in the direction of the hand-held power tool 10j, until a stop element 111j of the filter carrier 100j impinges on the housing 12j of the hand-held power tool 10j. In particular, the filter carrier 100j, in the fastened state, between the second fastening element 122*j* and the stop element 111*j*, is accommodated virtually without play on the hand-held power tool 10*j*, as a result of which a further pivoting movement is prevented. In the fastened state, the first fastening element 120*j* of the filter carrier 100*j* engages, in the form of springing latching elements, in corresponding securing elements 20*j* of the hand-held power tool 10*j* in the form of pockets. Advantageously, the first fastening elements 120*j* are arranged on elongate wings of the filter carrier 100*j*. It is also conceivable, however, for the first fastening elements 120*j* to be arranged at an end-face end region of the filter carrier 100*j* or in the rotary joint.

The invention claimed is:

1. A hand-held power tool, comprising:
   a housing defining a longitudinal axis and including an outer curved surface extending along the longitudinal axis and a rear surface extending from the outer curved surface and intersecting the longitudinal axis;
   at least one first securing element formed in the outer curved surface of the housing;
   at least one second securing element formed in the rear surface of the housing; and
   a filter carrier including:
      at least one filter carrier element having at least one first receiving opening configured to receive a first filter element;
      at least one first fastening element extending from a first interior surface of the filter carrier and configured to separably fasten to the at least one first securing element via positive engagement to mount the filter carrier on the housing; and
      at least one second fastening element extending from a second interior surface of the filter carrier and configured to separably fasten to the at least one second securing element via non-positive engagement to mount the filter carrier on the housing; and
      an actuating unit including a structured surface region formed on an outer surface of the filter carrier opposite the first interior surface,
   wherein the at least one first fastening element is located between the structured surface region and the rear surface of the housing along the longitudinal axis when the filter carrier is mounted on the housing,
   wherein the first filter element covers at least one air opening formed in the outer curved surface of the housing when the filter carrier is mounted on the housing, and
   wherein the filter carrier is configured such that in response to a radial force effected upon the structured surface region toward the longitudinal axis, the at least one first fastening element is separated from the at least one first securing element to enable removal of the filter carrier from the housing.

2. The hand-held power tool as claimed in claim 1, wherein the at least one first fastening element and the at least one second fastening element are positioned at opposite end regions of the filter carrier.

3. The hand-held power tool as claimed in claim 1, wherein when the filter carrier is mounted on the housing the filter carrier is arranged substantially along the longitudinal axis with the first interior surface positioned against the outer curved surface and with the second interior surface positioned against the rear surface.

4. The hand-held power tool as claimed in claim 1, wherein the at least one first fastening element is a latching element.

5. The hand-held power tool as claimed in claim 1, wherein the at least one first fastening element is integral with the actuating unit.

6. The hand-held power tool as claimed in claim 1, wherein the filter carrier is substantially U-shaped.

7. The hand-held power tool as claimed in claim 1, wherein the at least one second securing element is an air inlet opening of the hand-held power tool.

8. The hand-held power tool as claimed in claim 1, wherein the outer surface of the filter carrier is configured such that, when the filter carrier is mounted on the housing, the outer surface is flush with an outer surface of the housing extending from the outer curved surface.

9. The hand-held power tool as claimed in claim 1, wherein:
   the at least one filter carrier element includes at least one second receiving opening configured to receive a second filter element, and
   the second filter element covers at least one air opening formed in the rear surface of the housing when the filter carrier is mounted on the housing.

10. The hand-held power tool as claimed in claim 1, wherein:
    the at least one first fastening element extends toward the longitudinal axis when the filter carrier is mounted on the housing, and
    the at least one second fastening element extends parallel to the longitudinal axis when the filter carrier is mounted on the housing.

11. The hand-held power tool as claimed in claim 1, wherein:
    the radial force effected upon the structured surface region moves a distal end of the at least one first fastening element toward the rear surface of the housing to separate the at least one first fastening element from the at least one first securing element and to enable the removal of the filter carrier from the housing.

* * * * *